TIME DIVISION MULTIPLEX RESONANT TRANSFER TRANSMISSION SYSTEM

Filed May 25, 1959

4 Sheets-Sheet 1

INVENTOR.
THEODOR FRANKEL

BY F. H. Henson

ATTORNEY

United States Patent Office 3,061,680

Patented Oct. 30, 1962

3,061,680
TIME DIVISION MULTIPLEX RESONANT TRANSFER TRANSMISSION SYSTEM

Theodor Frankel, Rochester, N.Y., assignor to General Dynamics Corporation, Rochester, N.Y., a corporation of Delaware Filed May 25, 1959, Ser. No. 815,498
5 Claims. (Cl. 179—15)

The present invention relates to time division multiplex resonant transfer transmission systems.

The present invention is an improvement on the system disclosed in copending application Serial No. 814,926 filed May 21, 1959, and assigned to the same assignee as the present invention.

In the time division multiplex resonant transfer transmission system disclosed in the above-identified application, the lines terminating at a switching center are interconnected with the switching equipment in the center by a plurality of transmission networks or highways of the time division channel type and the channels of the networks or highways are individually assigned to the lines. A plurality of link circuits are provided in the system disclosed in the above-identified application for completing communication connections between channels of the same network or highway or between the channels of different networks or highways depending upon whether the calling and called lines are assigned channels on the same or different highway, respectively. Each link circuit includes low pass filters and sometimes phase equalizers for demodulating signals received over the channels assigned to the calling and called lines served by that link circuit.

Accordingly, it is a principal object of the present invention to provide a new, improved and less expensive time divsion multiplex resonant transfer transmission system.

It is a further object of the present invention to provide an improved time division multiplex transmission system which eliminates low pass filters and phase equalizers in each link circuit.

It is a further object of the present invention to eliminate the reconstruction of the original audio signal in the link circuit by the utilization of low pass filters as is done in the system disclosed in the afore-mentioned copending application.

It is yet a further object of the present invention to provide for an improved time division multiplex resonant transfer transmission system which is capable of connecting together two lines each coupled to different time division channels or highways, each line being assigned to the same time slot, without reconstructing in the link circuit the audio signal applied to one of the lines, thereby providing for resonant transfer between all stages.

Accordingly, the principal feature of the present invention is the provision of an intermediate resonant transfer stage in each link circuit which makes it possible to utilize strict resonant transfer throughout the system, even though two lines associated with different highways and connected together by a particular link circuit are assigned to the same time slot.

Figure 1:
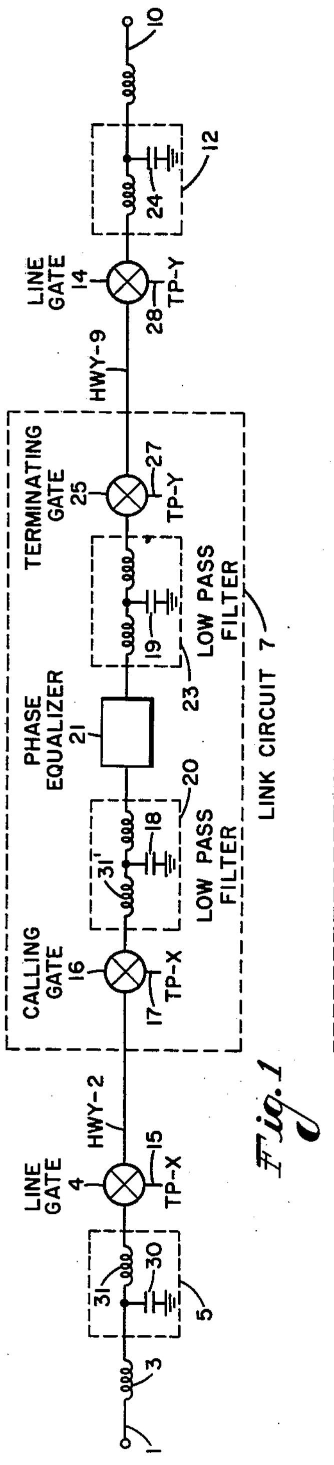

Further objects, features and the attending advantages of the invention will become apparent with reference to the following specification and drawings in which:

FIGURE 1 discloses a portion of the system disclosed in the aforementioned copending application.

Figure 2:
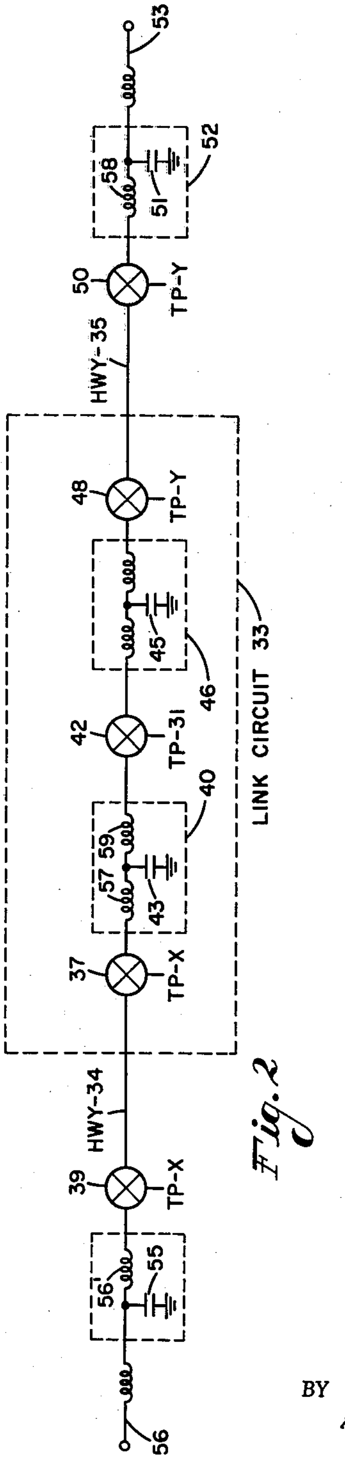

FIGURE 2 discloses a portion of the system of the present invention.

Figure 3:
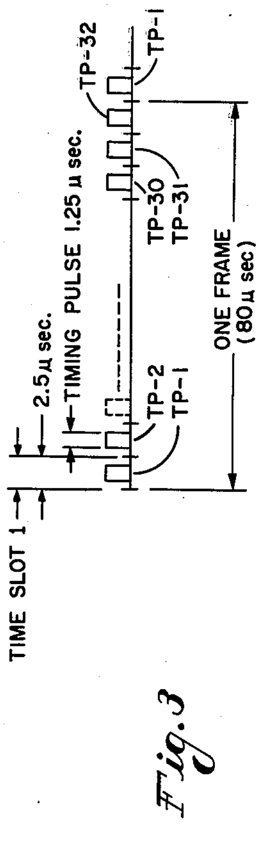

FIGURE 3 discloses a pulse diagram.

Figure 4:
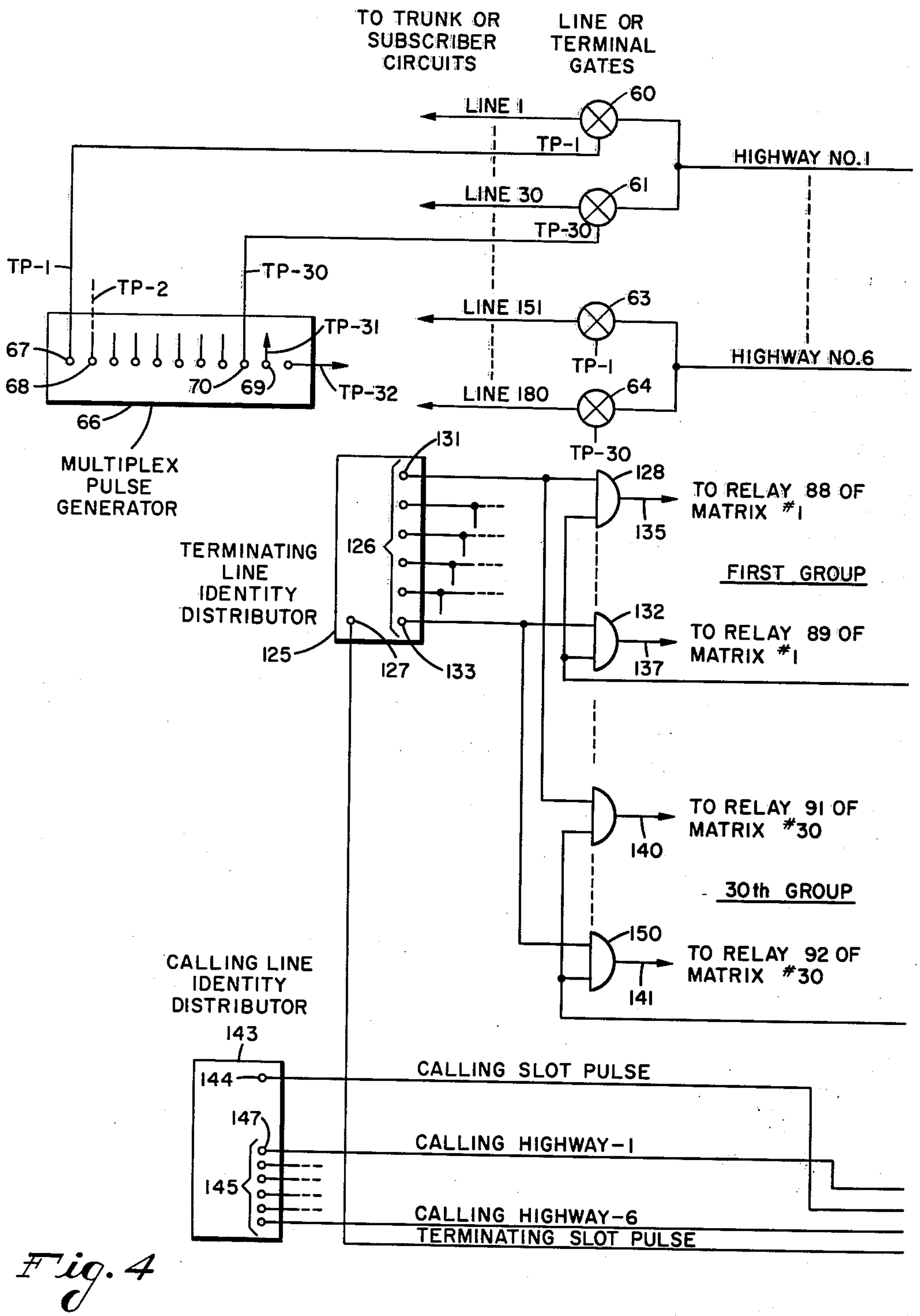
Figure 5:
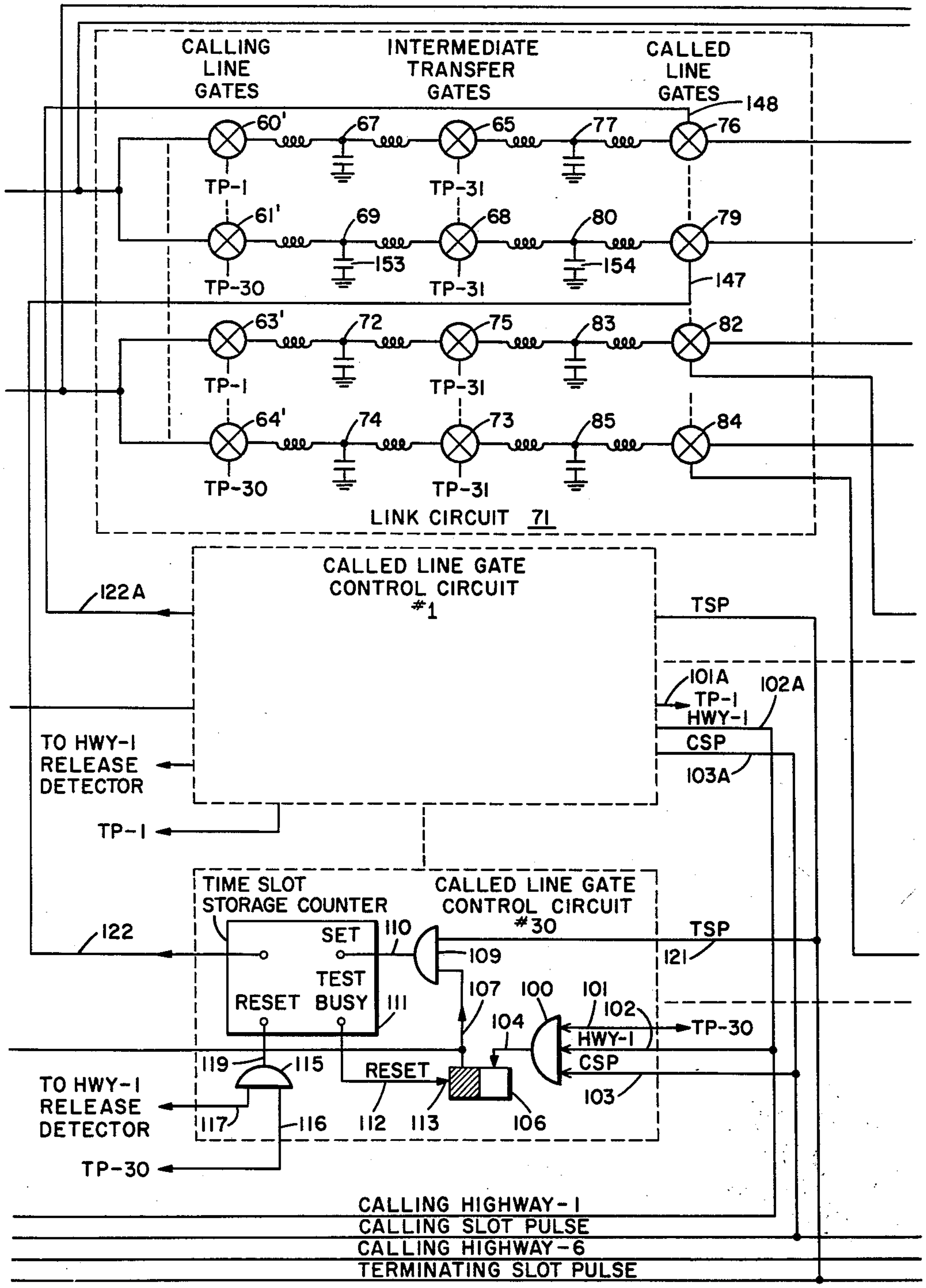
Figure 6:
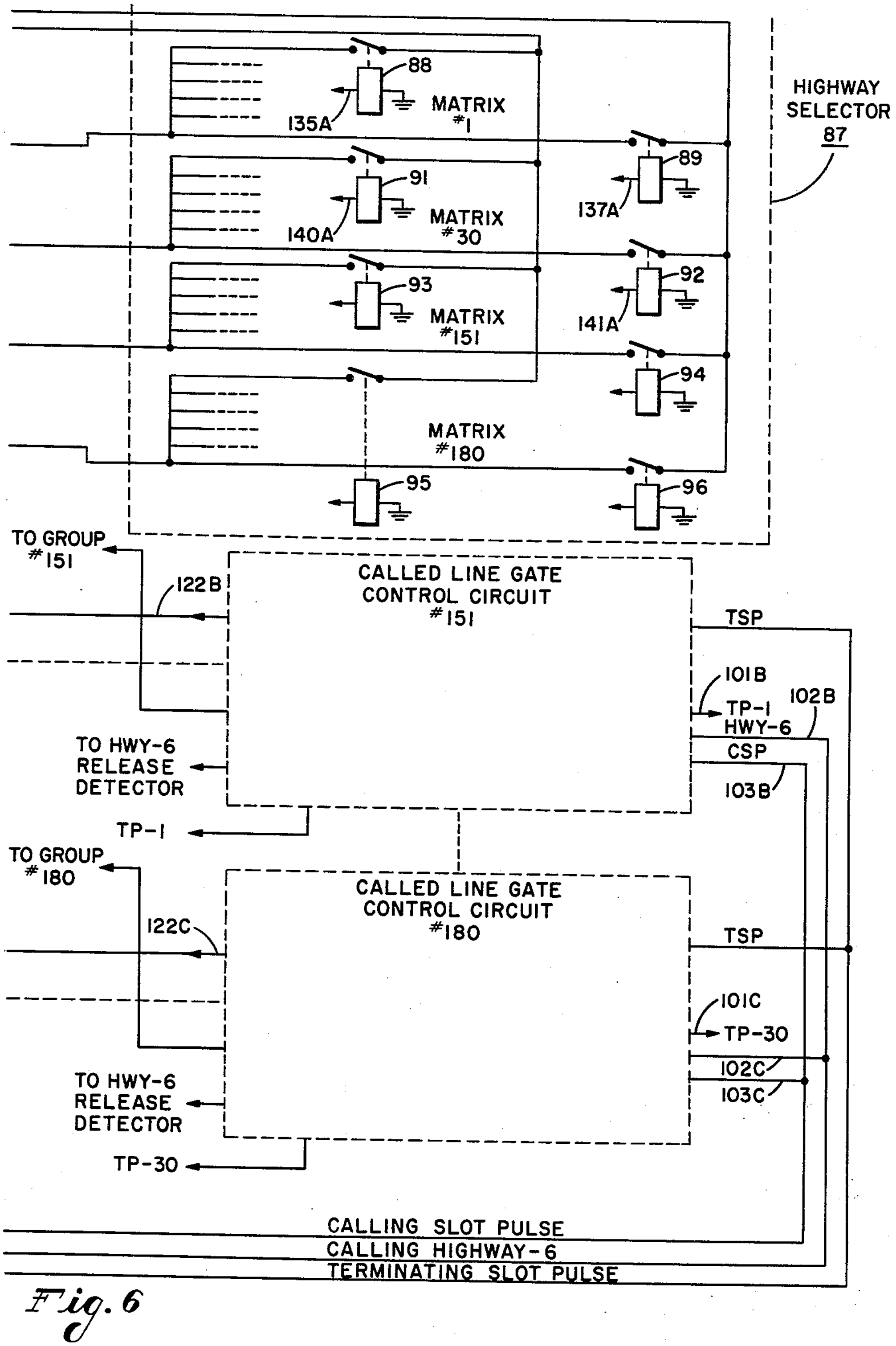

FIGURES 4, 5 and 6 disclose a preferred embodiment of the system of the present invention.

Referring now to FIGURE 1 of the drawing which discloses merely a portion of the entire system disclosed in the aforementioned copending application, line 1 which communicates with a subscriber set, not shown, is disclosed in the left-hand portion of FIGURE 1. This line is coupled to one end of time division channel or highway 2 through line choke 3, filter 5 and line gate 4. Link circuit 7 is shown as being utilized to couple a time division channel or highway 2 with a time division channel or highway 9. Line 10 is coupled to time division channel 9 through filter 12 and line gate 14 at its remote end. Line gate 4 may be enabled by the application of a pulse to its control terminal 15 and link circuit calling gate 16 may be enabled by the application of a pulse to its control terminal 17. Both of the aforementioned gates are simultaneously enabled by a time position defining pulse TP—X, which action causes line 1 to be coupled to link circuit 7 during the duration of TP—X. Time position defining pulse TP—X is generated during a certain portion or time slot of each time position frame, this portion being assigned to line 1. Thus, during an assigned time slot within each timing frame, the electrical charge present on capacitor 30 of line filter 5 is completely transferred to capacitor 18 of low pass filter 20 which reconverts these recurring bursts of energy back into the original audio signal. Delay distortion is produced in the low pass filters of the link circuit of FIGURE 1 since signals of varying frequencies will be delayed for varying amounts of time. This distortion is of no importance if the system is utilized only for voice transmission but if data transmission is desired, the distortion must be eliminated by a phase equalizer which is inserted between filter 20 and filter 23. The simultaneous enabling of terminating gate 25 and line gate 14 by the application of time position defining pulse TP—Y to the control terminals of these gates causes the entire charge on capacitor 19 of low pass filter 23 to be transferred to capacitor 24 of filter 12 by resonant transfer. The time position or slot within each timing frame containing pulse TP—Y is determined by directive signals transmitted by the calling party whose subscriber station is coupled to line 1. Thus, the time position of TP—Y represents the identity of a called party subscriber set coupled to line 10. The pulse transmitted over highway 9 is fed to filter 12 once each frame and again the audio signal is reconstructed at this filter. Line gate 4 and link circuit calling gate 16 are enabled during their assigned time slot by timing pulse TP—X having a duration equal to one-half the period of oscillation of the resonant circuit comprising capacitor 30, inductor 31, 31′ and capacitor 18 so that the entire charge on capacitor 30 is transferred to capacitor 18 during the duration of TP—X. This type of transfer is known as resonant transfer and is discussed fully in the aforementioned copending application. Resonant transfer also is provided between filter 23 and filter 12 in the same manner. Because there is no resonant transfer between filter 20 and filter 23, line gate 4 and calling gate 16 may be enabled during the same interval of time in each frame as terminating gate 25 and line gate 14 or stated differently, TP—X may occur at the same time as TP—Y.

FIGURE 2 discloses a link circuit 33, which is shown as being utilized to couple a time division channel or highway 34 with a time division channel or highway 35. In this arrangement, resonant transfer occurs between every stage in the system in contrast to the arrangement of FIGURE 1. Link circuit 33 includes calling gate 37 which is enabled simultaneously with line gate 39 by time position defining pulse TP—X which is simultaneously applied to the control terminals of these gates. An intermediate transfer gate 42 which is enabled during a time interval within each frame which is not assigned to any line gate, provides for the complete transfer of the charge on capacitor 43 of first resonant transfer stage 40 to capacitor 45 of second resonant transfer stage 46. Terminal gate 48 is enabled by time position defining pulse TP—Y simultaneously with line gate 50 and provides for the complete transfer of the charge present on capacitor 45 of the second resonant transfer stage 46 to capacitor 51 of filter 52, this filter, in turn, being coupled to line 53 associated with a called party subscriber set. The charge on capacitor 55 is similarly completely transferred to capacitor 43 upon the simultaneous application of time position defining pulse TP—X to the control terminals of gates 37 and 39, this pulse occurring during the time slot in each frame assigned to line 56. Again, as in FIGURE 1, the time of occurrence of time position defining pulse TP—Y is determined by directive signals transmitted by a calling party. At the end of each frame, timing pulse 31 shown in FIGURE 3 which is not assigned to any line circuit, causes the entire charge on capacitor 43 of first resonant transfer stage 40 to be transferred completely to capacitor 45 of the intermediate or second resonant transfer stage.

One important point to be noted at this time is that in the arrangement of FIGURE 2, TP—X and TP—Y may occur simultaneously. This is made possible only by the intermediate or second resonant transfer stage which is the crux of the present invention. To provide for resonant transfer between capacitor 55 and capacitor 43, the duration of TP—X should be one-half of the period of oscillation of the resonant circuit formed by capacitor 55, inductor 56′, inductor 57 and capacitor 43. If the intermediate stage was not provided and if TP—X should occur simultaneously with TP—Y, the above-mentioned resonant circuit would also include inductors 58, 59 and capacitor 51 so that half the period of oscillation of the resonant circuit would be different for this special case, and since the duration of the time position defining pulse remains the same for all cases, complete resonant transfer would not take place and a charge would remain on capacitor 55. In the embodiment of FIGURES 4 and 5, thirty lines are assigned to each highway, and therefore it would be a fairly common occurrence to have two lines assigned to the same time position defining pulse but coupled to different highways, connected together. By including an intermediate transfer stage as hereinbefore described, the special case mentioned above would never exist because the gate utilized in this stage is never open when other gates in the system are open.

If it is desired to use the system of the present invention for the transmission of data, no phase equalizer need be provided in the link circuit, in contrast to the system disclosed in the afore-mentioned copending application, since low pass filters are not utilized in the link circuit of the present invention and the transmission of intelligence by resonant transfer between all stages causes the intelligence to be delayed a fixed amount regardless of the frequencies of the original signals.

Referring now to FIGURES 4, 5, and 6 of the drawing which are to be placed with FIGURE 5 to the right of FIGURE 4 and FIGURE 6 to the right of FIGURE 5, a two-wire time division multiplex switching system is shown utilizing link circuits having intermediate transfer gates as shown in FIGURE 2 of the drawing. Six highways are provided each serving thirty subscribers so that a total of one hundred and eighty subscribers will be served by this system. As shown in FIGURE 4, line 1 is coupled to highway #1 through bidirectional terminal gate 60, the circuit of which is disclosed in the afore-mentioned copending application. Line 30 is coupled to highway #1 through terminal gate 61. Lines 2—29 with their associated terminal gates are not shown on the drawing. Line 151 is coupled to highway #6 through bidirectional terminal gate 63 and line 180 is coupled to highway #6 through bidirectional terminal gate 64. Highways #2—#5 with their associated groups of terminal gates and lines are represented by the dotted lines of the figure. These terminal gates each have a control terminal coupled to multiplex pulse generator 66 which can be any known type of distributor or chain counter. The multiplex pulse generator has a group of thirty-two output terminals. The first output terminal 67 of generator 66 is connected to the control terminals of first terminal gate 60 and first terminal gate 63 along with the control terminals of four other first terminal gates associated with the four highways not shown. A time position defining pulse TP–1 as shown in FIGURE 3 appears at terminal 67 once each pulse frame in time slot 1. Time position defining pulse TP–2, which appears at terminal 68 of generator 66, is fed to the control terminals of the second terminal gate in each group, which terminals are not shown on the drawing. Terminal 70 of pulse generator 66 produces time position defining pulse 30 in timing slot 30 once each frame as shown in FIGURE 3 to thereby simultaneously enable the thirtieth gate in each group. Thus, pulse generator 66 sequentially opens corresponding terminal gates in each group once each frame to couple each line in each group to its associated highway for a small fraction of the total time to thereby provide for time sharing of each highway.

Link circuit 71 as shown in FIGURE 5 comprises six groups of thirty calling line gates, six groups of thirty intermediate transfer gates, six groups of thirty called line gates with six groups of thirty first resonant transfer stages connected between the calling line gates and the intermediate transfer gates and six groups of thirty second resonant transfer stages connected between the intermediate transfer gates and the called line gates all as shown in FIGURE 5. Thus, the first calling line gate 60′ corresponds to the first terminal gate 60 and the thirtieth calling line gate 61′ corresponds to the thirtieth terminal gate 61. Similarly, the one hundred and fifty-first calling line gate 63′ corresponds to the one hundred and fifty-first terminal gate 63 and the one hundred and eightieth calling line gate 64′ corresponds to the one hundred and eightieth terminal gate 64. The first intermediate transfer gate 65 is coupled to the first calling line gate 60′ through the first resonant transfer stage 67. The thirtieth intermediate transfer gate 68 is connected to the thirtieth calling line gate 61′ through the thirtieth resonant transfer stage 69. The one hundred and fifty-first intermediate transfer gate 75 is connected to the one hundred and fifty-first calling line gate 63′ through the one hundred and fifty-first resonant transfer stage 72 whereas the one hundred and eightieth intermediate transfer gate 73 is connected to the one hundred and eightieth calling line gate 64′ through the one hundred and eightieth resonant transfer stage 74. Similarly, the first called line gate 76 is connected to the first intermediate transfer gate 66 through resonant transfer stage 77. The thirtieth called line gate 79 is connected to the thirtieth intermediate transfer gate 68 through resonant transfer stage 80. The one hundred and fifty-first called line gate 82 is connected to the one hundred and fifty-first intermediate transfer gate 75 through resonant transfer stage 83 and the one hundred and eightieth called line gate 84 is connected to the one hundred and eightieth intermediate transfer gate 73 through resonant transfer stage 85. The control terminals of the thirty calling line gates in each of the six groups are connected to the thirty terminals of generator 66 as indicated in the figures to thereby provide for sequential operation of calling line gates in each of the six groups in step with the sequential operation of their associated terminal gates. The control terminals of all of the intermediate transfer gates are coupled to terminal 69 of generator 66 at which terminal appears time position defining pulse TP–31 in the thirty-first time slot as shown in FIGURE 3. Thus all of the intermediate transfer gates are simultaneously enabled after the sequential operation of the thirty calling line gates in each group during each frame.

The right-hand terminals of the called line gates are coupled to highway selector 87 as shown in FIGURE 6 which functions to selectively connect these terminals to the particular highway with which a called subscriber is associated. Highway selector 87 comprises one hundred and eighty matrices, each having a set of six self-locking relays, and each matrix having all six of its input terminals coupled to an associated called line gate as shown. Thus matrix #1 has a first self-locking relay 88 and a sixth self-locking relay 89, relay 88 being arranged to couple the right-hand terminal of the first called line gate 76 to highway #1 and relay 89 arranged to couple the right-hand terminal of the first called line gate 76 to highway #6. Similarly, relay 91 of matrix #30 serves to couple the right-hand terminal of the thirtieth called line gate 79 to highway #1 and relay 92 serves to couple the right-hand terminal of this gate to highway #6. In like manner, relay 93 of matrix #151 serves to couple the right-hand terminal of the one hundred and fifty-first called line gate 82 to highway #1 and relay 94 serves to couple this same terminal to highway #6. Relays 95 and 96 of matrix #180 operate in similar fashion. It should be understood that only the first and sixth self-locking relays are shown, and four intermediate ones of each matrix serve to couple the right-hand terminal of the associated called line gate to highways #2—#5.

Six groups of thirty called line gate control circuits are provided, one for each called line gate. The thirtieth called line gate control circuit of the first group is shown in detail in FIGURE 5. The thirtieth called line gate control circuit 98 of the first group of called line gate control circuits comprises AND gate 100 having input terminals 101, 102 and 103. Output terminal 104 of this AND gate is coupled to an input terminal of bistable element 106 which may be a flip-flop or any other well-known bistable element. An output terminal 107 of bistable element 106 is coupled to a first input terminal of AND gate 109. An output terminal of AND gate 109 is connected to input or "set" terminal 110 of time slot storage counter 111 which is fully disclosed in the afore-mentioned copending application. The time slot storage counter 111 may be regarded as an externally triggered ring counter whose operation will be described hereinafter. A pulse circulating in the time slot storage counter 111 after it is triggered will mark lead 112 which is connected to the test busy terminal of the storage counter and is also connected to reset terminal 113 of bistable element 106. An AND gate 115 has its input terminal 116 connected to the thirtieth terminal 70 of generator 66 and has its input terminal 117 connected to a release detector which may be any device coupled to highway #1 which is capable of scanning the channels for a frequency which is produced when a calling party hangs up. This detector may be similar to the seize detector disclosed in the afore-mentioned copending application. Output lead 119 of AND gate 115 is connected to the reset terminal of the time slot storage counter 111 to halt its operation when the calling party hangs up. The called line gate control circuit 98 has an input terminal 121, which is connected to a second input terminal of AND gate 109, an output terminal 122, and three enabling terminals 101, 102 and 103.

Terminating line identity distributor 125 as shown in FIGURE 4 has a set of six output terminals 126 and a terminating slot pulse output terminal 127. This distributor is disclosed in the aforementioned copending application and marks one of the set of six output terminals 126 depending upon the highway to which the called line is coupled and a terminating slot pulse appears at terminal 127 during the time slot assigned to the called party's line when the time position identity of the called line is to be read in by the circuitry illustrated in FIGURES 4, 5 and 6.

One hundred and eighty groups of six AND gates are provided, each group controlling the set of six self-locking relays of its associated matrix. The first AND gate 128 of the first group of AND gates has a first input terminal connected to terminal 131 of terminating line indentity distributor 125. A first input terminal of the sixth AND gate 132 is connected to the sixth terminal 133 of distributor 125. The second, third, fourth and fifth AND gates in the first group of AND gates are not shown, but have first input terminals similarly connected to the second, third, fourth and fifth terminals of distributor 125. Similarly, the first input terminals of the remaining 179 groups of AND gates are coupled to the terminating line identity distributor 125. All of the second input terminals of the AND gates of each group are connected to the output terminal of the bistable element forming part of the called line gate control circuit associated with that group. Output terminal 135 of AND gate 128 is connected to input terminal 135A of the first relay 88 of matrix #1 and output terminal 137 of the sixth AND gate 132 is connected to input terminal 137A of the sixth relay 89 of matrix #1. The output terminals of the second, third, fourth and fifth AND gates of the first group are similarly connected to the second, third, fourth and fifth relays of matrix #1 not shown. In like manner, output terminal 140 of the first AND gate in the thirtieth group, is connected to input terminal 140A of the first relay 91 of matrix #30, and output terminal 141 of the sixth AND gate in the thirtieth group is connected to input terminal 141A of the sixth relay 92 of matrix #30. It should be understood that intermediate groups of AND gates are connected in like manner to intermediate groups of matrices.

Calling line identity distributor 143 which is disclosed in the afore-mentioned copending application has a calling slot pulse terminal 144 and a set of six calling highway terminals 145. The second enabling terminal 102A of called line gate control circuit #1 is connected to the first terminal of the set of called highway terminals 145 as is the second enabling terminal 102 of called line gate control circuit #30. The corresponding second enabling terminal of gate control circuits #2—#29 are also connected to this terminal. In like manner the second enabling terminals of gate control circuits #151—#180 are all connected to the sixth terminal of set 145 of distributor 143. Likewise, the four intermediate groups of gate control circuits have their corresponding second enabling terminals connected to corresponding intermediate terminals of the distributor 143. Thus the six calling highway terminals serve to partially enable one of six groups of called line gate control circuits (during each switching process) depending upon the highway to which the calling party's subscriber set is coupled.

First enabling terminal 101A of called line gate control circuit #1 and first enabling terminal 101B of called line gate control circuit #151 are connected to the first terminal 67 of generator 66. The first enabling terminal of gate control circuits #31, #61, #91 and #121 (not shown) are also coupled to terminal 67. Similarly, the first enabling terminal 101 of gate control circuit #30 and first enabling terminal 101C of gate control circuit #180 are both connected to the thirtieth terminal 70 of this distributor as are the first enabling terminals of gate control circuits #60, #90, #120 and #150. First enabling terminals of intermediate gate control circuits in each group are of course connected to intermediate terminals of pulse generator 66.

The third enabling terminals of all one hundred and eighty gate control circuits are connected to the calling slot pulse terminal 144 of calling line identity distributor 143.

Input terminal 121 of called line gate control circuit #30 is connected to the terminal slot pulse output terminal 127 of terminal line identity distributor 125 as are all of the corresponding input terminals of every called line gate control circuit.

Output terminal 122 of gate control circuit #30 is connected to control terminal 147 of the thirtieth called line gate 79 and is also connected to a second input terminal of each AND gate in the thirtieth group of AND gates. Output terminal 122A of the first gate control circuit is connected to control terminal 148 of first called line gate 76 and is also coupled to the second input terminals of all six AND gates in the first group of AND gates. The output terminals of gate control circuits #2—#29 are connected to the intermediate called line gates in the first group and are also connected to the second input terminals of corresponding intermediate groups of AND gates. In like manner, output terminal 122B of gate control circuit #151 is connected to the control terminal of the first called line gate 82 in the sixth group of called line gates and is connected to partially enable the one hundred and fifty-first group of AND gates, whereas output terminal 122C of gate control circuit #180 is connected to the control terminal of the thirtieth called line gate 84 in the sixth group of called line gates and is connected to the second input terminals of the one hundred and eightieth group of AND gates.

The operation of the system will be described, followed by an example. The pulses developed by generator 66 cause the terminal gates in each group to sequentially become enabled along with corresponding calling line gates in each group. The values of the inductors and capacitors in each stage and the values of the inductors and capacitors in the filters associated with the subscriber lines, and the duration of the time position defining pulses are selected so that the charge on the capacitor in a preceding stage is completely transferred to the capacitor of a subsequent stage by resonant transfer. After charges have been sequentially transferred to all thirty capacitors of the first resonant transfer stages of each group from corresponding line filters, time position defining pulse 31 appears at terminal 69 of generator 66 and since this terminal is connected to the control terminals of all intermediate transfer gates, they are simultaneously enabled during time slot 31 to cause any charges present on the capacitors of the first resonant transfer stages to be completely transferred to the capacitors of the second resonant transfer stages by resonant transfer. Time position defining pulse 32 shown in FIGURE 3 is used for test purposes which have nothing to do with the present invention. Register equipment, which is fully disclosed in the above-identified application, registers directive signals transmitted over a calling line and the identity of the time positions and highways assigned to the calling line and the called line corresponding to the registered signals are then read out by distributors 143 and 125, respectively, to initiate the switching of the calling line to the selected called line. Transmission from a calling line to a called line is performed by enabling the particular called line gate which is associated with the calling line during the time slot in each frame which is assigned to the called line. One relay of the matrix which is coupled to the particular called line gate thus enabled is energized for the length of the call so that the intelligence pulse is not only produced in the time slot assigned to the called line, but is produced only on the highway to which the called line is coupled. Thus, the selection process involves enabling a particular called line gate which is associated with the particular calling line, at a particular time in each frame which is a function of the time slot assigned to the called line, and coupling this particular called line gate to one of six highways to thereby select the desired one of six lines all having the same assigned time slot.

As previously discussed, one called line gate control circuit is provided to control each called line gate. The called line gate control circuit which is associated with the called line gate to be enabled, is conditioned so that a terminating slot pulse applied to its input terminal causes this particular gate control circuit to thereafter produce a control pulse on its output terminal in the time slot within each frame assigned to the called line. The one called line gate control circuit which is conditioned at a particular time, simultaneously receives pulses on all three of its enabling terminals to thereby cause bistable element 106 to change its state and condition gate 109 so that it will convey the terminating slot pulse thereafter received on input terminal 121 to the set terminal of the time slot storage counter, which in turn regenerates the timing slot pulse during subsequent frames, in the same time slot as that occupied by the terminating slot pulse.

During a particular selection process one of the six calling highway terminals 145 of calling line identity distributor 143 is marked to thereby partially enable one of six groups of called line gate control circuits. The gate control circuits in this particular group are further partially enabled sequentially by the application of pulses to the AND gate in each gate control circuit corresponding to gate 100 in control circuit #30 from generator 66. Calling slot pulse terminal 144 of calling line identity distributor 143 produces a calling slot pulse during the time slot assigned to the calling party's line, so that only the gate control circuit associated with this line in the selected group is conditioned for operation. After the conditioning of a particular gate control circuit, a terminating slot pulse is applied to the input terminal of this particular gate control circuit by terminal 127 of terminating line identity distributor 125. This pulse is passed by the AND gate corresponding to gate 109 in control circuit #30 and triggers the time slot storage counter into operation. This counter thereafter produces output pulses which enable the particular called line gate to which the output terminal of the control circuit is connected, during the same time slot occupied by the terminating slot pulse which triggered the counter.

As the bistable element in the conditioned gate control circuit changes state, the group of AND gates associated with this gate control circuit is enabled. Since the terminating line identity distributor 125 causes only one of the set of terminals 126 to be marked depending upon the highway to which the called party's line is coupled, a pulse will be passed by only one of the AND gates in the enabled group to thereby actuate one of the six self-locking relays of the proper matrix to perform highway selection. No other relay in this matrix will be thereafter affected since the enabled group of AND gates is disabled by the prompt resetting of the bistable element by a pulse produced at the test busy terminal of the storage counter. This pulse is produced shortly after the counter is triggered into operation and also functions to disable AND gate 109 so that other subsequently produced terminating slot pulses will have no effect upon the time slot storage counter 111.

Assume that a calling party whose subscriber station is coupled to line 30 of highway #1 wishes to call a party whose subscriber station is coupled to line 30 of highway #6. When line selecting signals received over the calling line have been registered and the selected called line has been determined to be idle, terminal 147 of calling line identity distributor 143 is marked to thereby partially enable gate control circuits #1—#30. A calling slot pulse appears at terminal 144 of distributor 143 in the time slot assigned to the calling party's line. Since this pulse will be applied to gate control circuit #30 simultaneously with timing pulse 30, bistable element 106 of gate control circuit #30 only will be triggered to condition AND gate 109. Simultaneously with the above, a terminating slot pulse appears at terminal 127 of terminating line identity distributor 125 in the time slot assigned to the called line. This pulse is fed to the input terminals 121 of all gate control circuits, but only triggers the time slot storage counter 111 of gate control circuit #30 into operation causing called line gate 79 to be thereafter enabled during the thirtieth time slot in each frame. The highway identity of the called line causes terminal 133 of terminating line identity distributor 125 to be marked thereby to produce an output pulse on output lead 141 of AND gate 150 to energize self-locking relay 92. This action causes the righthand terminal of the enabled called line gate 79 to be connected to highway #6.

During the thirtieth time slot terminal gate 61 and calling line gate 61' will be simultaneously enabled to transfer a charge to capacitor 153 of resonant transfer stage 69 once each time position frame which is proportional to the integral of the audio signal present on line 30 during the preceding 77.5 $\mu$sec. The charge on capacitor 153 is completely discharged into capacitor 154 during time slot 31, and is stored there until the reoccurrence of time slot 30 at which time the charge on capacitor 154 is discharged into the filter capacitor assigned to line 30 of highway #6. This filter reconstructs the audio signal present on line 30 and the process is complete.

To repeat, resonant transfer between all stages is had although the calling and called lines may occupy the same time slot. This is made possible by the buffer action of the intermediate transfer stages whose associated gates are enabled during a time interval within each frame which is not assigned to any calling or called line.

When the calling party hangs up, a release detector which is coupled to the highway to which the calling party's line is coupled, produces a pulse in the time slot assigned to the calling party's line. This pulse is applied to AND gate 115 along with TP–30, to cause the time slot storage counter 111 to be reset. Thus the calling party's gate control circuit is prepared for another call. Since the terminal gates, calling line gates, intermediate transfer gates and called line gates are all bidirectional, it should be obvious that a two way conversation may be maintained over the two-wire system disclosed in FIGURES 4, 5, and 6. It should also be obvious that a four-wire system may be provided if desired by duplicating the gates with their associated resonant transfer stages and matrices. It should also be obvious that a great many calls may be simultaneously carried on over this system although only one call has been described. Transmission is not limited to telephony since binary or other information may be readily handled by the system.

While I have shown and described a specific embodiment of my invention, other modifications will readily occur to those skilled in the art. I do not therefore desire my invention to be limited to the specific arrangement shown and described, and I intend in the appended claims to cover all modifications within the spirit and scope of my invention.

What is claimed is:

1. In a time division multiplex resonant transfer transmission system wherein energy is transferred during time intervals within repetitive transmission frames, a first and second highway, a first group of terminal gates coupled to said first highway, a second group of terminal gates coupled to said second highway, a group of calling line gates each having first and second terminals, a group of first storage devices, a group of intermediate transfer gates each having first and second terminals, a group of second storage devices, a group of called line gates each having first and second terminals, the first terminal of each calling line gate being coupled to said first highway and the second terminal of each calling line gate coupled to the first terminal of a corresponding intermediate transfer gate and to a first storage device, the second terminal of each intermediate transfer gate coupled to the first terminal of a corresponding called line gate and to a second storage device, the second terminal of each called line gate being coupled to said second highway through a highway transfer switch, means for sequentially and repetitively enabling the gates in said first and second group of terminal gates and said group of calling line gates, means for enabling at least some of the intermediate transfer gates only during a single time period within repetitive transmission frames when none of the gates in said group of calling line gates and said group of called line gates are enabled and means to enable called line gates during time intervals assigned to terminal gates associated with called parties.

2. The combination as set forth in claim 1 wherein both first and second storage devices include capacitors.

3. The combination as set forth in claim 1 wherein both first and second storage devices include capacitors and at least half of the total of said first and second storage devices include inductors connected in series with said capacitors.

4. The combination as set forth in claim 3 wherein said means for enabling said first and second group of terminal gates and said group of calling line gates, said means for enabling all of the intermediate transfer gates and said means to enable called line gates all enable their associated gates for a time interval in each time position frame equal to $$\frac{N}{2}$$

of the natural period of oscillation of the resonant circuit formed by the stages connected to the first and second terminal of each gate when enabled, N being an odd integer, to thereby provide for resonant transfer of energy from one stage to the next.

5. In a time division multiplex transmission system wherein energy is transmitted during time intervals within repetitive transmission frames, a group of $n$ first, $n$ second, $n$ third and $n$ fourth storage devices, where $n$ is an integer, greater than one, a group of $n$ signal sources each source coupled to an input circuit of an associated first storage device of said group of $n$ first storage devices, a group of $n$ detectors each coupled to an output circuit of an associated fourth storage device of said group of $n$ fourth storage devices, means for transferring energy from each storage device of said group of $n$ first storage devices to an associated storage device of said group of $n$ second storage devices during a first time interval within repetitive transmission frames, means for transferring energy from any one storage device of said group of $n$ third storage devices to an associated storage device of said group of $n$ fourth storage devices during said first time interval, and means for transferring energy from at least some of said second storage devices to said group of $n$ third storage devices only during a single second time interval within repetitive transmission frames not within said first time interval.

References Cited in the file of this patent

UNITED STATES PATENTS

| | | |
|---|---|---|
| 2,718,621 | Heard et al. | Sept. 20, 1955 |
| 2,819,457 | Hamilton et al. | Jan. 7, 1958 |
| 2,828,418 | Knight et al. | Mar. 25, 1958 |
| 2,870,259 | Norris | Jan. 20, 1959 |
| 2,872,665 | Townsend et al. | Feb. 3, 1959 |
| 2,936,337 | Lewis | May 10, 1960 |
| 2,936,338 | James et al. | May 10, 1960 |
| 2,962,551 | Johannesen | Nov. 29, 1960 |
| 2,962,552 | Crowley | Nov. 29, 1960 |